No. 810,381. PATENTED JAN. 16, 1906.
J. RIDDELL & C. C. M. MORTENSEN.
TOOL GRINDING DEVICE.
APPLICATION FILED AUG. 2, 1905.

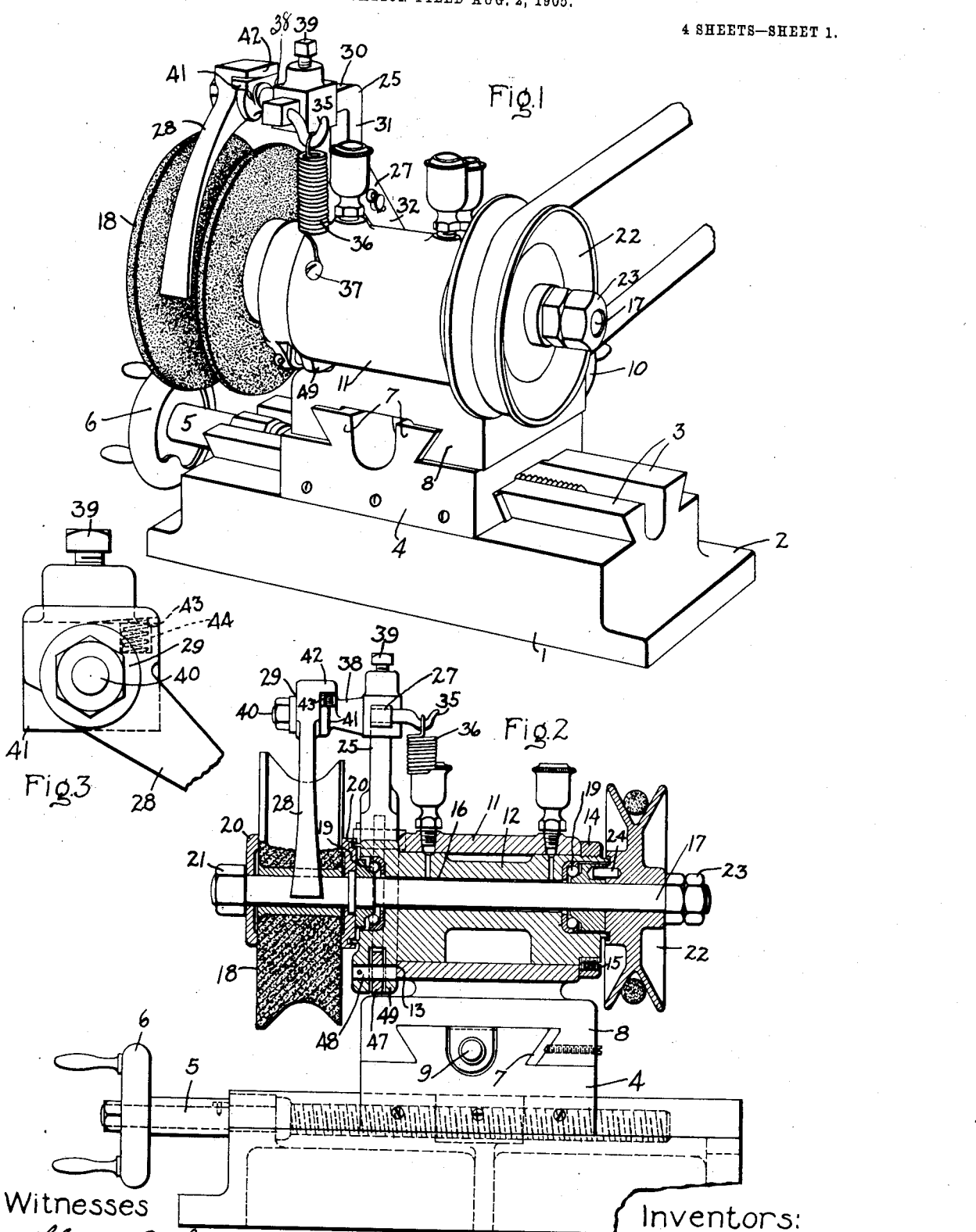

4 SHEETS—SHEET 2.

Witnesses:
Lloyd C. Bush
Benjamin B. Hull

Inventors:
John Riddell,
Casper C. M. Mortensen
By Albert H. Davis Att'y

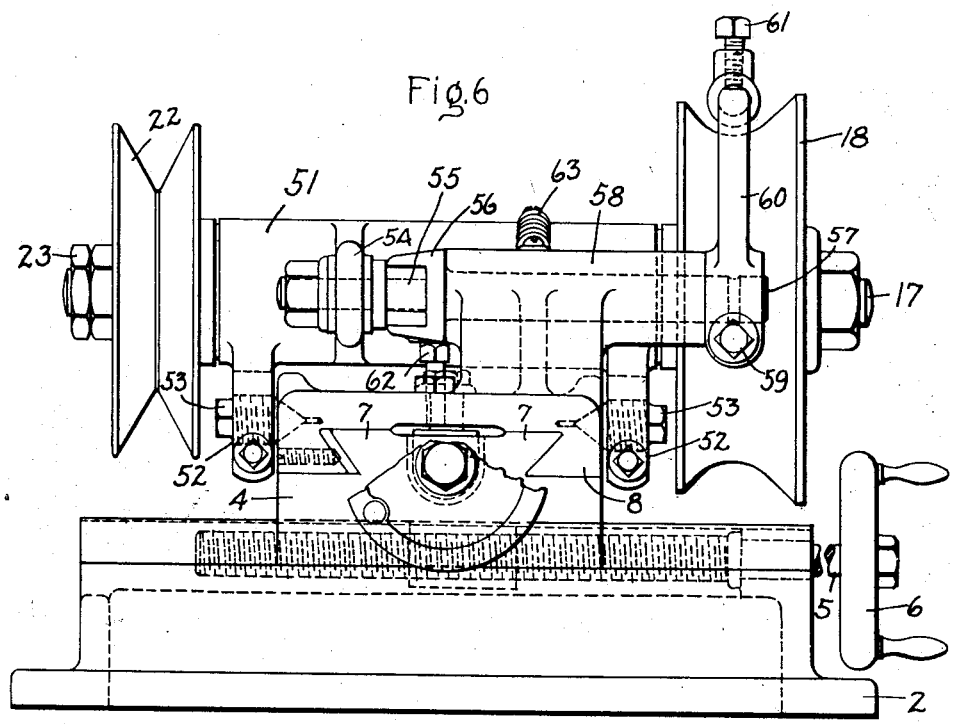
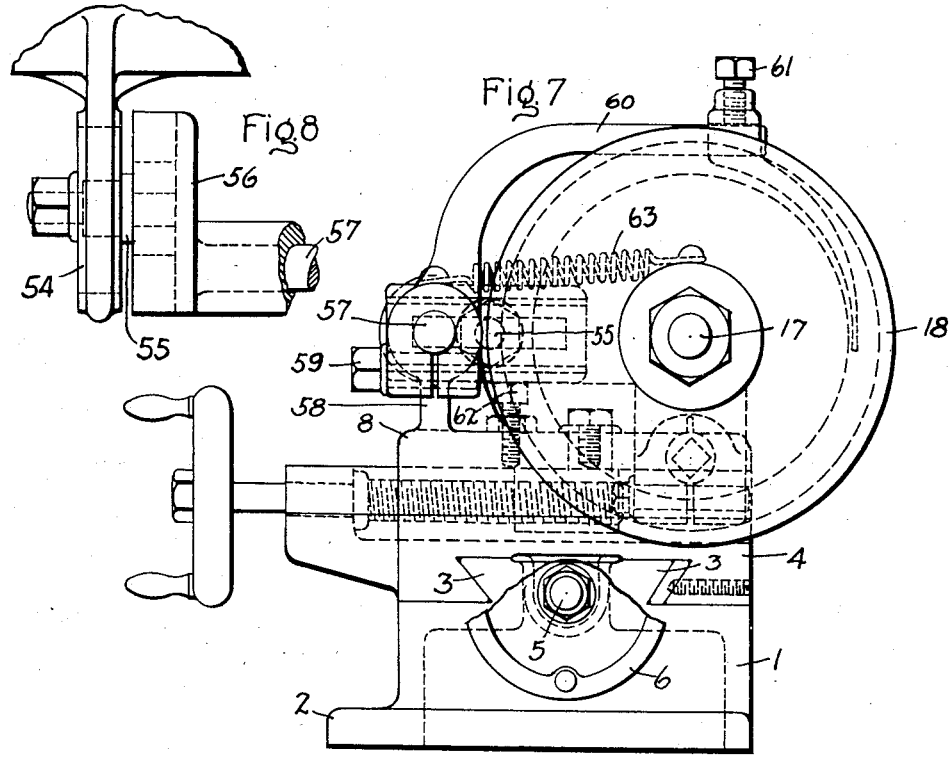

No. 810,381.

PATENTED JAN. 16, 1906.

J. RIDDELL & C. C. M. MORTENSEN.
TOOL GRINDING DEVICE.
APPLICATION FILED AUG. 2, 1905.

4 SHEETS—SHEET 4.

Witnesses:
Lloyd C. Bush
Benjamin B. Hull

Inventors:
John Riddell,
Casper C. M. Mortensen,
By Albert N. Davis
Atty.

UNITED STATES PATENT OFFICE.

JOHN RIDDELL AND CASPER C. M. MORTENSEN, OF SCHENECTADY, NEW YORK.

TOOL-GRINDING DEVICE.

No. 810,381.  Specification of Letters Patent.  Patented Jan. 16, 1906.

Application filed August 2, 1905. Serial No. 272,347.

*To all whom it may concern:*

Be it known that we, JOHN RIDDELL and CASPER C. M. MORTENSEN, citizens of the United States, residing at Schenectady, county of Schenectady, and State of New York, have invented certain new and useful Improvements in Tool-Grinding Devices, of which the following is a specification.

The present invention relates to grinding devices for sharpening machine-tools, and more especially tools having a series of teeth or cutting edges which travel in a definite path, and has for its object to provide a simple and highly-efficient apparatus of this character which will operate upon milling-cutters and similar tools having a series of cutting edges without removing them from the machine in which they are used to accurately shape the several cutting edges at uniform distances from their axis of motion or planes of action and with the same angle of clearance.

Our grinding apparatus is designed to be placed in proximity to the tool to be sharpened, and the latter is caused to move slowly in its accustomed manner past the periphery of the grinding-wheel. In order to cause the wheel to advance toward each tooth as it moves, thereby to shape the latter with the required clearance, the shaft of the grinding-wheel is journaled in an oscillating bearing-block, and the latter is caused to move back and forth by an actuating-lever which extends at one end into the path of the teeth of the tool, so as to be moved by a tooth through an arc corresponding to the period of engagement of the grinding-wheel with the tooth being ground. It then escapes from the tooth and the bearing-block is returned to its original outer position by a spring or other retractile means. The grinding-wheel is now in position to engage the next succeeding tooth, and the operation above described is repeated.

For a more complete understanding of the invention reference may be made to the following detailed description and the accompanying drawings, forming a part of this specification, in which—

Figure 4:
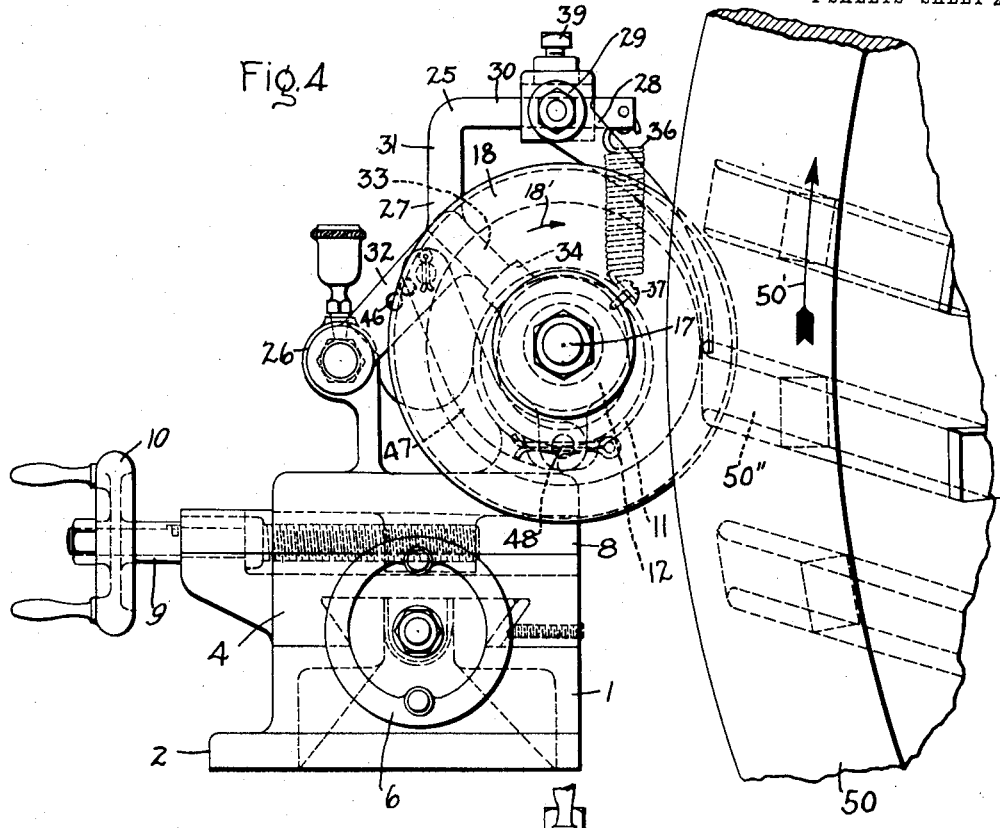
Figure 5:
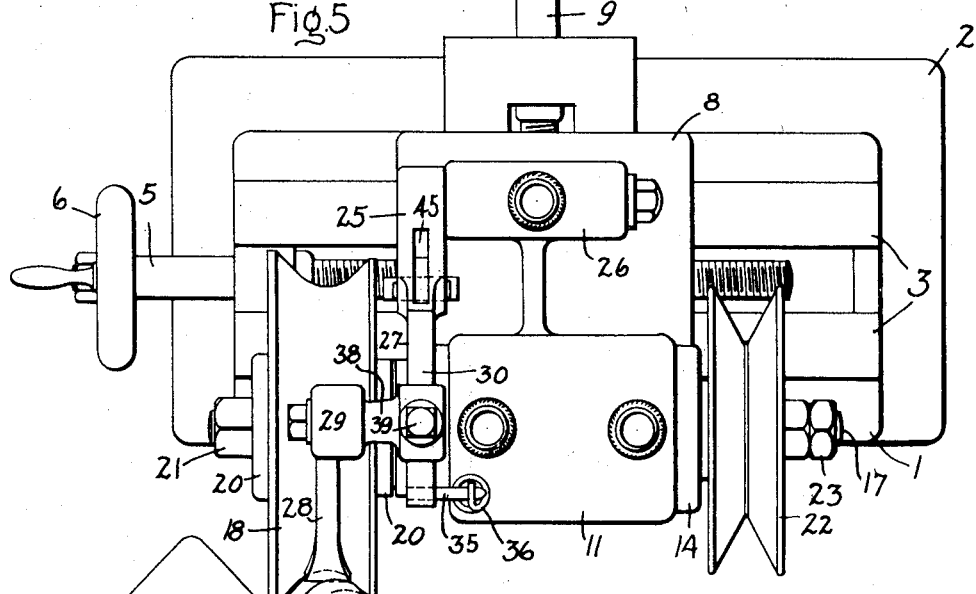
Figure 10:
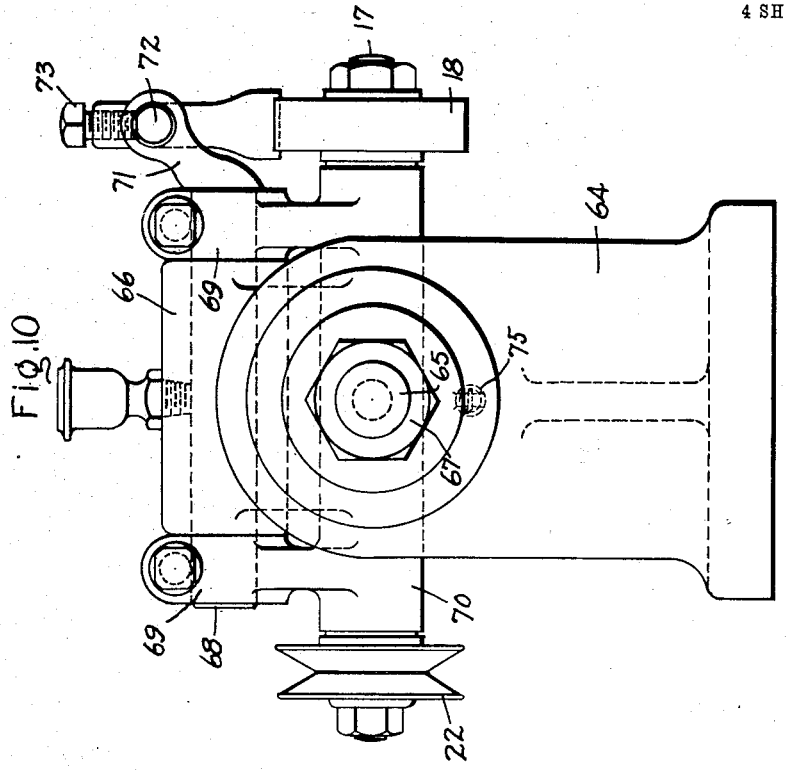
Figure 9:
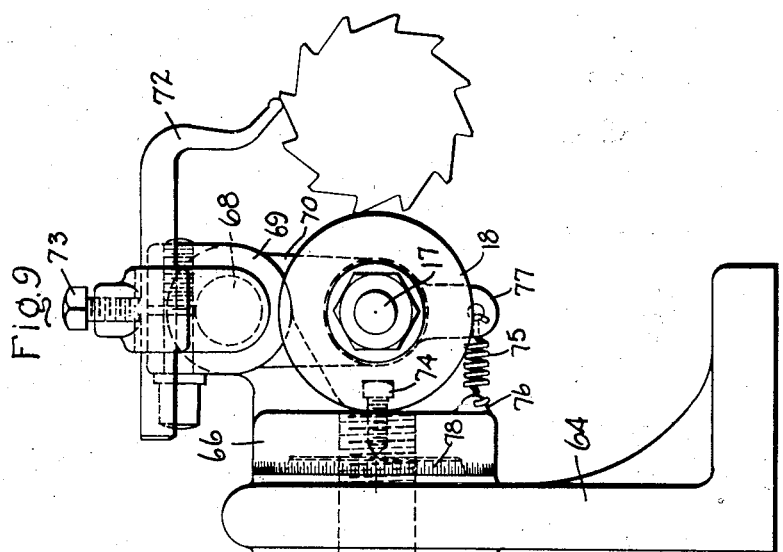

Figure 1 is a perspective view of a grinding-machine embodying one form of our invention. Fig. 2 is a vertical axial section thereof. Fig. 3 is a detail elevation of the joint of the actuating-lever. Fig. 4 is an end elevation of the machine shown in operative position to the tool of a rotary planer. Fig. 5 is a plan of the same. Fig. 6 is a rear elevation of a modified form of grinding-machine. Fig. 7 is an end elevation of the same. Fig. 8 is a detail elevation of the adjustable joint between the actuating-lever and the oscillating bearing-block. Fig. 9 is an end elevation of a further modified form of grinding-machine, and Fig. 10 is a rear elevation of the same.

In the constructions shown in Figs. 1 to 8 a bed-block 1 is provided which has a bottom flange 2 to enable the grinding device to be clamped to some part of the machine whose cutting-tool is to be ground. The upper surface of the bed-block is provided with longitudinal dovetailed ways 3 for the reception of a carriage 4, and in the end of the block is journaled a lead-screw 5, which engages the carriage 4 and is provided with an operating hand-wheel 6. The upper surface of the carriage 4 is provided with transverse dovetailed ways 7 for the reception of a bearing-support 8, and in the rear side of the carriage 4 is journaled a transverse lead-screw 9, which engages the bearing-support 8 and is provided with an operating hand-wheel 10.

In the construction shown in Figs. 1 to 5 the bearing-support 8 has on its upper surface near its front edge a cylindrical bearing 11 for the reception of an eccentric bearing-block 12. The bearing-block 12 is enlarged at its left-hand end and provided with a radial shoulder 13, which engages the end of the bearing 11, and at its right-hand end is cut a screw-thread for the reception of a nut 14, which is locked thereon by a top screw 15 and operates to prevent axial movement of the bearing-block in the support 8. Extending eccentrically through the bearing-block 12 parallel to its axis is an aperture 16 for the passage of the shaft 17 of the grinding-wheel 18, and at the ends of the apertures 16 are formed cavities for the reception of ball-bearings 19. The grinding-wheel 18 is clamped to the left-hand end of the shaft by plates 20 and nut 21, and at the right-hand end of the shaft a belt-pulley 22 is held by nuts 23 and pin 24.

The actuating-lever 25 is fulcrumed in a bearing 26, projecting upwardly from the bearing-support 8, and it consists of two members 27 and 28, connected by a knuckle-joint 29. The rear member 27 has an upper horizontal section 30 with a vertical section 31, bent down from the rear end of the horizontal section, and an inclined section 32, extending from the lower end of the vertical section to the fulcrum. Opposite the angle between the inclined and vertical sections 32 and 31 is a stop projection 33, which normally rests upon a projection 34 on the enlarged left-hand end of the eccentric bearing-block 12, and at the front end of the horizontal section 30 is a hook 35, with which a helical spring 36 engages at one end, while the opposite end is attached to the cylindrical bearing 11 by a screw 37. This spring operates to return the parts to their normal positions, as indicated in Fig. 4. The front member 28 of the actuating-lever is in the form of a downwardly-bent finger and is pivoted upon an adjustable arm 38, having a transverse aperture therethrough for receiving the horizontal section 30 of the rear member, and at one side of the aperture is a set-screw 39 for clamping the arm 38 in adjusted position. The outer end of the arm 38 has a stub-shaft 40, on which the front member 28 is pivoted, and a horizontally-shouldered flange 41 at the inner end, which coöperates with a shouldered projection 42 at the rear end of the front member. The shoulder on flange 41 is made in a single plane, whereas the shoulder on projection 42 is in two planes, making an obtuse angle to each other to permit a slight movement of the front member 28 upon its stub-shaft 40, and in order to maintain the outer end of member 28 in elevated position an expansion-spring 43 is arranged in a recess 44 in the flange 41, as indicated in Fig. 3. The inclined section 32 of the rear member is provided with a long vertical aperture 45 and a series of transverse holes 46 for adjustably connecting thereto the rear end of a bent link 47, which is connected at its front end to a pin 48, carried by lugs 49, formed at the lower side of the left-hand end of the eccentric bearing-block 12, as shown in Figs. 1, 2, and 4.

In Figs. 4 and 5 the grinding device above described is shown in operative relation to the cutter 50 of a rotary planer. The grinding-wheel 18 rotates at high speed in the direction of arrow 18', and the cutter 50 is rotated at slow speed in the direction of arrow 50', and the front member 28 of the actuating-lever rests upon the upper edge of the tooth 50'' being ground. As the cutter 50 moves upwardly the actuating-lever is turned back upon its fulcrum, and the motion thereof is communicated through the bent link 47 to the eccentric bearing-block 12, causing the latter to rotate in its bearing 11 and carrying the shaft 17 and the grinding-wheel 18 toward the cutter 50, to thereby undercut the rear corner of the tooth 50'' to the required angle of clearance. As the tooth 50'' travels beyond the plane of action of the grinding-wheel 18 its leading corner passes out of the arc described by the forward end of the actuating-lever 25, while the lower corner of the tooth may be still within the arc; but by reason of the knuckle-joint 29 the forward member moves slightly toward the fulcrum and is thereafter thrown out into position to engage the succeeding tooth by the spring 43, and all parts of the grinding device are automatically returned to their normal positions, as indicated in Fig. 4, by the recoil of spring 36.

In the modified form of grinding apparatus shown in Figs. 6, 7, and 8 the oscillating bearing-block 51 is provided with lugs 52 near its ends, in which are tapped screws 53 with conical ends, which engage corresponding recesses in opposite sides of the bearing-support 8. The bearing-block 51 carries the shaft 17, with the pulley 22 and grinding-wheel 18 thereon, as in the construction above described. The means for rocking the bearing-block 51 on the bearing-support 8 consists of a slotted arm 54, projecting from its rear side and carrying an adjustable crank-pin 55, and coöperating with said pin is a channeled crank 56, carried by a shaft 57, supported in a bearing 58 at the rear of the support 8 and having clamped to its opposite end by a screw 59 the actuating-lever 60. The rear member of the lever 60 is bent up vertical and then horizontal, and the front member of the lever is adjustably clamped thereto by a set-screw 61. The crank 56 normally rests upon an adjustable stop in the form of a screw 62, tapped into the upper surface of the support 8, and a helical spring 63 is connected to the upper surfaces of the bearing-block 51 and the bearing 58, which operates to yieldingly hold the parts in normal position, as indicated in Fig. 7.

In the construction shown in Figs. 9 and 10, which is designed for grinding smaller cutting-tools than the constructions above described, an angle-block 64 is provided with a shouldered bearing in its vertical member for the reception of a threaded shaft 65 of a bearing-support 66, which is adapted to be clamped thereto at any desired angle by a nut 67. The bearing-support 66 has a shaft 68 journaled in its upper part, and to the opposite ends of this shaft are clamped lugs 69 of a reversible bearing-block 70, which extends downwardly therefrom and carries the shaft 17, with the pulley 22 and grinding-wheel 18 connected, as in the other constructions. One end of the shaft 68 has rigidly connected thereto a crank 71 with a transverse aperture for the reception of a reversible actuating-lever 72, which is rigidly clamped in adjusted position therein by a set-screw 73. The actuating-lever 72 is made in one piece, with its forward end bent downwardly and forwardly, as shown in Fig. 9, in position to be engaged by a tooth of the cutter in advance of the tooth being ground. The bearing-block 70 normally bears at its lower end against an adjustable stop-screw 74, set in the front end of the threaded shaft 65, and a helical spring 75 is connected at opposite ends to lugs 76 and 77, projecting, respectively, from the lower end of the bearing-support 66 and the bearing-block 70 and serves to return the parts of the device to their normal positions. The rear end of the bearing-support 66, which engages the angle-block 64, is turned up and graduated at 78 in order that the axis of the grinding-wheel may be adjusted to any desired angle relatively to the axis of the cutting-tool. This construction of grinding device is designed to be connected to a cross-fed bed of the machine-tool and traversed back and forth thereby to carry the grinding-wheel 18 the entire width of the teeth of the cutting-tool. When the teeth of the cutting-tool are of spiral shape, the bearing-support 66 is set at an angle in the block 64, so as to bring the plane of rotation of the grinding-wheel 18 at right angles to the edge of the respective teeth, and in order to make the device universally applicable to all types of milling-machines the angle-block 64 is made reversible with respect to the bearing-support 66, and the bearing-block 74 is made reversible end for end by merely releasing the clamping-lugs 69 from the shaft 68, withdrawing the latter from the bearing-support 66 and reinserting it in the opposite direction with the bearing-block 74 also reversed. The actuating-lever 72 is also changed end for end in the crank 71.

We do not desire to restrict ourselves to the particular form or arrangements of parts herein described and shown, since it is apparent that they may be changed and modified without departing from our invention.

What we claim as new, and desire to secure by Letters Patent of the United States, is—

1. In a device for grinding tools having a series of teeth movable in a definite path, the combination with the grinding-wheel and its driving means, of means controlled by the movement of the tool operated upon for causing the grinding-wheel to move toward each tooth as it passes said wheel.

2. In a device for grinding tools having a series of teeth movable in a definite path, the combination of a movable bearing-block in which the shaft of the grinding-wheel is journaled, and means controlled by the movement of the tool operated upon for moving said bearing-block whereby the grinding-wheel is caused to traverse each tooth of the tool at an angle to its path of motion.

3. In a device for grinding tools having a series of teeth movable in a definite path, the combination of a movable block in which the shaft of the grinding-wheel is journaled, and a controller-lever operatively connected to said block and extending into the path of the teeth to be actuated thereby, whereby the grinding-wheel is caused to traverse each tooth of the tool at an angle to its path of motion.

4. In a device for grinding tools having a series of teeth movable in a definite path, the combination of an oscillating bearing-block in which the shaft of the grinding-wheel is journaled eccentrically to the axis of oscillation, and means controlled by the movement of the tool operated upon for oscillating said bearing-block whereby the grinding-wheel is caused to traverse each tooth at an angle to its path of motion.

5. In a device for grinding tools having a series of teeth movable in a definite path, the combination of a bearing-support, an oscillating bearing-block carried thereby and in which the shaft of the grinding-wheel is journaled eccentric to the axis of oscillation, and an actuating-lever operatively connected to said block and extending into the path of said teeth whereby the grinding-wheel is caused to traverse each tooth at an angle to its path of motion.

6. In a device for grinding tools having a series of teeth movable in a definite path, the combination of a bearing-support, an oscillating bearing-block carried thereby in which the shaft of the grinding-wheel is journaled eccentrically to the axis of oscillation, and an actuating-lever fulcrumed upon said bearing-support, operatively connected to said bearing-block and extending into the path of said teeth whereby the grinding-wheel is caused to traverse each tooth at an angle to its path of motion.

7. In a device for grinding tools having a series of teeth movable in a definite path, the combination of a bearing-support, an oscillating bearing-block carried thereby in which the shaft of the grinding-wheel is journaled eccentrically to the axis of oscillation, and an actuating-lever fulcrumed upon said support adjustably connected to said bearing-block and extending at one end into the path of said teeth.

8. In a device for grinding tools having a series of teeth movable in a definite path, the combination of a bearing-support, an oscillating bearing-block in which the shaft of the grinding-wheel is journaled eccentrically to the axis of oscillation, an actuating-lever fulcrumed upon said support, operatively connected to said block and extending at one end into the path of said teeth to be actuated in one direction thereby, and a spring for returning the parts of the device to normal position after each escapement of the actuating-lever from a tooth.

9. In a device for grinding tools having a series of teeth movable in a definite path, the combination of an oscillating bearing-block in which the shaft of the grinding-wheel is journaled eccentrically to the axis of oscillation, and an actuating-lever operatively connected to said block and comprising a rear section fulcrumed to some stationary part and a forward section connected thereto by a spring-pressed knuckle-joint.

In witness whereof we have hereunto set our hands this 1st day of August, 1905.

JOHN RIDDELL.
CASPER C. M. MORTENSEN.

Witnesses:
EDWARD WILLIAMS, Jr.,
BENJAMIN B. HULL.